United States Patent [19]

Liu

[11] 4,091,759
[45] May 30, 1978

[54] FLOATING DOCK FOR HANDLING CARGO
[75] Inventor: Diomedes Liu, Summit, N.J.
[73] Assignee: Sea-Land Service, Inc., Elizabeth, N.J.
[21] Appl. No.: 718,760
[22] Filed: Aug. 30, 1976
[51] Int. Cl.² ............................................. B65G 63/00
[52] U.S. Cl. ...................................... 114/263; 214/14; 114/264
[58] Field of Search .......................... 214/13, 12, 14; 114/258, 259, 260, 262, 263, 264, 265, 267; 61/48, 49

[56] References Cited

U.S. PATENT DOCUMENTS

| | | | |
|---|---|---|---|
| 2,331,613 | 10/1943 | Lienau | 214/14 |
| 2,628,727 | 2/1953 | Anschutz | 214/14 |
| 2,759,331 | 8/1956 | Fiebinger | 114/263 |
| 3,198,353 | 8/1965 | McDowell | 214/14 |
| 3,455,115 | 7/1969 | Watts | 61/48 |
| 3,559,822 | 2/1971 | Lichtenford | 214/14 |
| 3,727,776 | 4/1973 | Meeusen | 214/14 |
| 3,807,582 | 4/1974 | Anderson | 214/14 |

FOREIGN PATENT DOCUMENTS 695,980   8/1953   United Kingdom .................. 214/14

*Primary Examiner*—Trygve M. Blix
*Assistant Examiner*—D. W. Keen
*Attorney, Agent, or Firm*—David Rabin

[57] ABSTRACT

A floating dock for handling cargo in a moored vessel in which a longitudinally-extending cargo conveyor is retained in floating condition with the cargo conveyor supported on longitudinally-extending cargo conveyor supports to receive and convey cargo from one position to another.

5 Claims, 5 Drawing Figures

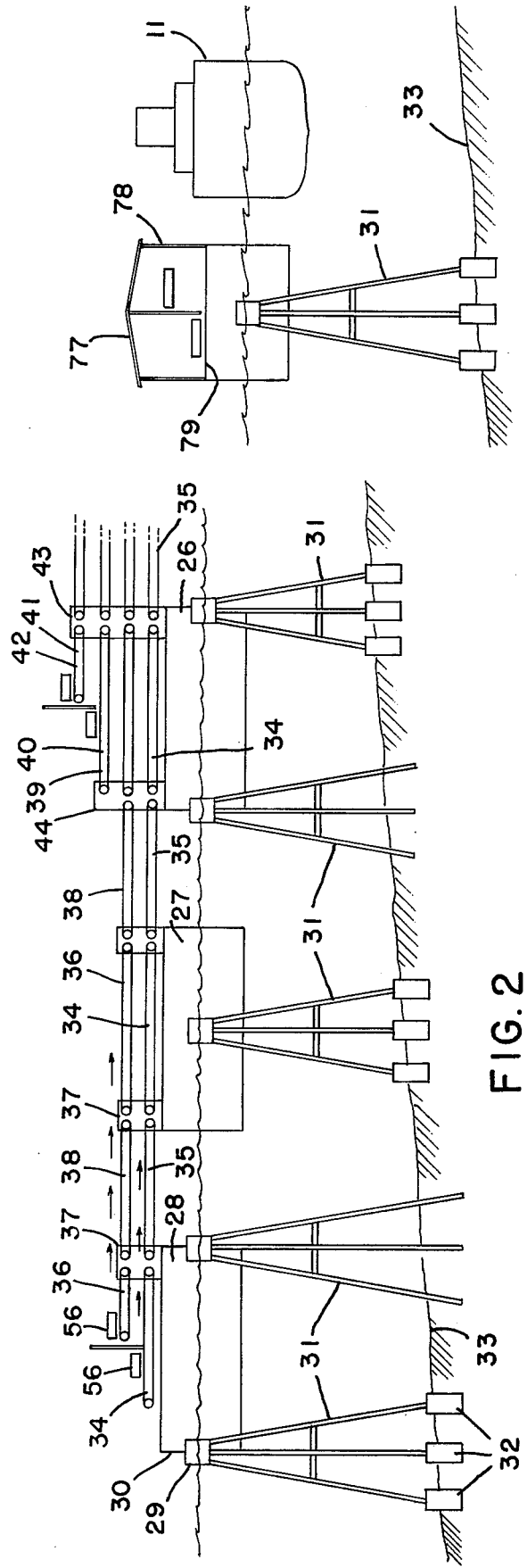
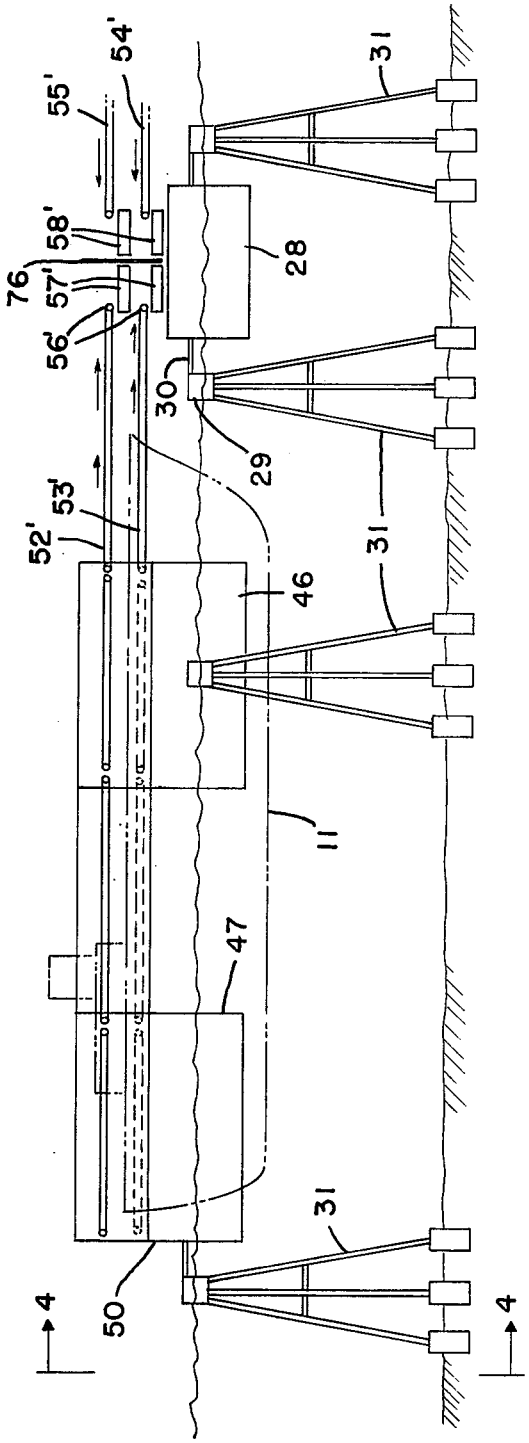

FLOATING DOCK FOR HANDLING CARGO

BACKGROUND, OBJECTIVES AND ADVANTAGES OF THE PRESENT INVENTION

Many seaports throughout the world, and particularly in undeveloped countries, have inadequate harbors to enable oceangoing vessels to dock and unload or load cargo. When landside pier is unavailable, large vessels must remain in deep water while loading and unloading cargo to or from barges or smaller vessels. In some instances, large vessels may be required to remain anchored in deep water for days or weeks depending upon the availability of loading and unloading labor crews and port and dockside facilities which are not only very costly and time consuming, but the cargo may become contaminated during long waiting periods. The high cost of non-use of a large vessel increases the cost of transportation of the cargo as well.

Furthermore, dredging a harbor to accomodate oceangoing vessels is extremely costly and time consuming. The necessity for the use of dredging equipment and skilled crews for this skilled work is not available in most undeveloped countries. The installation of adequate docks for handling incoming and outgoing cargo requires very substantial capital expenditures, costly installation equipment and extended periods of time for installation.

In some countries, the typography does not permit installation of permanent docks or dredging to permit large ocean-going vessles to be moored closer to the loading or unloading areas.

Therefore, the present invention is directed to a floating dock system for handling cargo which may be constructed or fabricated at various manufacturing plants remote from the location of installation, assembled at the location of installation and utilized to handle cargo from a moored vessel expeditiously with minimum labor utilization once installation is completed.

A further objective of this invention is the provision of a floating dock for handling cargo from a moored vessel in which the cargo may be loaded or unloaded from a series of traveling conveyors while directing the cargo along specific paths of travel to avoid commingling.

Still another objective of this invention is the provision of a floating dock for handling cargo including containerized units which may be lifted from or to a vessel by means of a transportable gantry or crane whether mounted aboard the vessel or the floating dock or other floating derricks with means on the floating dock for handling a containerized unit in its travel to or from the vessel.

This invention further contemplates a floating dock for handling cargo which may be installed with suitable mooring to accommodate a number of vessels for loading and unloading as well as one which may be positioned at one end along a fixed unloading area on land with the floating dock projecting an appropriate distance into the water or an auxiliary unloading or loading that may be offshore depending upon the typography in which smaller vessels may receive the cargo for loading or unloading from a series of conveyors on the floating dock.

Still another objective invention is the provision of a floating dock for handling cargo in which a series of conveyors is supported at spaced intervals and extends longitudinally above the water and communicates with at least one transversely extending conveyor means for transporting cargo along the transversely extending conveyor to or from the longitudinally extending conveyor.

Other objectives and advantages of the floating dock cargo handling system of this invention will become more readily apparent to those skilled in the material handling art for handling cargo to and from vessels when considered in conjunction with the accompanying detailed description, claims and drawings of two embodiments which are disclosed without any limitation, and modifications are contemplated depending upon the specific installation taking into account the local typography and other requirements.

DESCRIPTION OF DRAWINGS

FIG. 2 is a partial end elevational view taken substantially along the line 2—2 of FIG. 1 illustrating spaced floating barges and mooring pylons with a series of cargo-receiving conveyors reaching in sections along a directed path of travel above the floating barges;

FIG. 3 is a partial elevational view taken substantially along the line 3—3 of FIG. 1 illustrating a moored vessel in position for loading or unloading cargo in juxtaposition with the floating dock conveyor means;

FIG. 4 is a partial end elevational view taken substantially along the line 4—4 of FIG. 3 illustrating one embodiment of the floating dock and conveyor means adjacent to one of the fingers or transversely extending conveyor sections adjacent to which a moored vessel is located.

DETAILED DESCRIPTION OF PREFERRED EMBODIMENTS OF THE INVENTION

Figure 1:
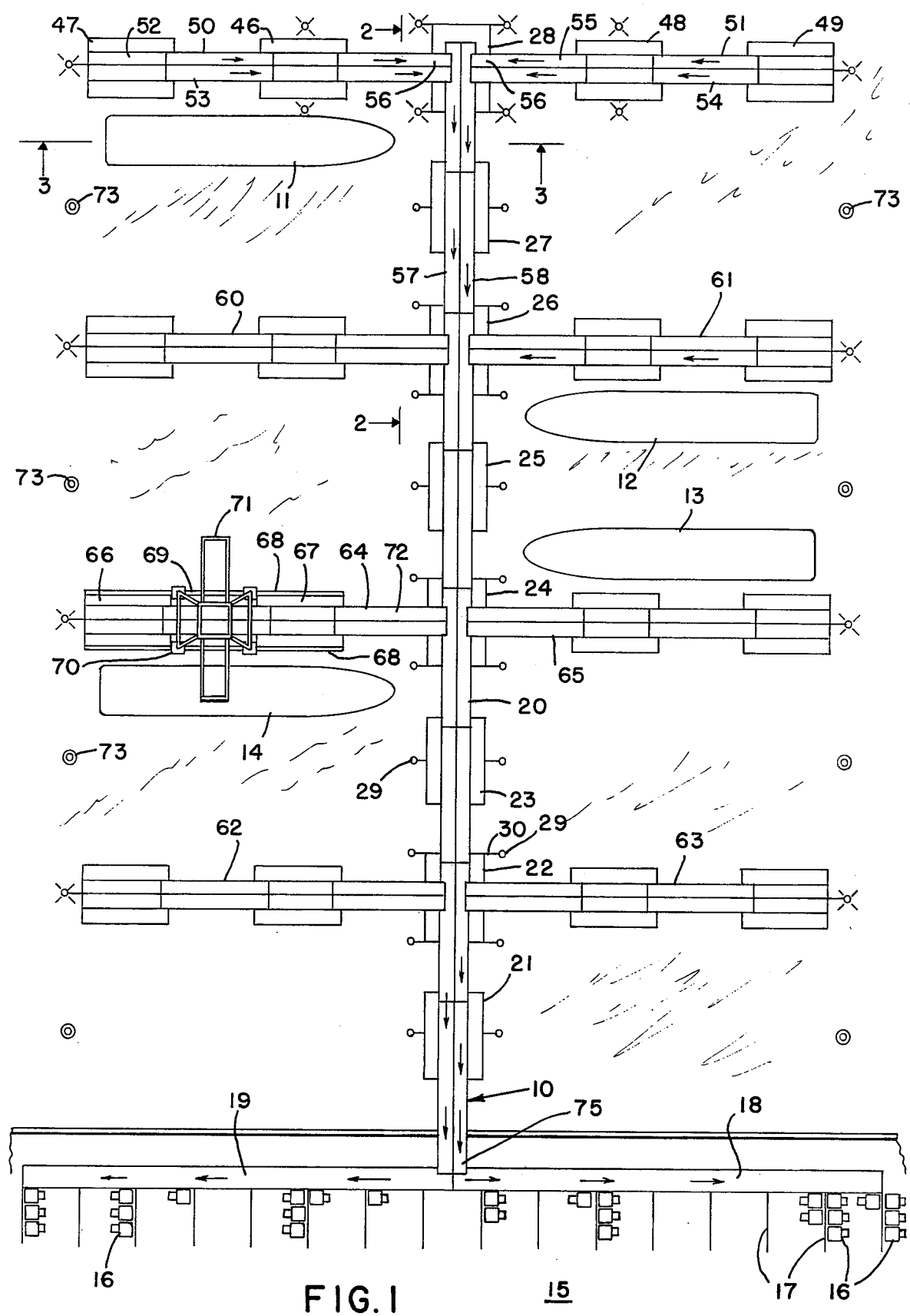
FIG. 1 is a schematic plan view of a floating dock arrangement illustrating one embodiment of this invention in which several moored vessels are positioned, and vehicles for carrying cargo to and from one of the terminal conveyors are in readiness.

Referring to the drawing and particularly to FIG. 1, there is illustrated a floating dock conveyor system 10 for handling cargo to and from moored vessels 11, 12, 13, and 14 to and from a loading and receiving zone 15 which may be a stationary vehicle parking area, in which a series of land vehicles may be parked adjacent to individual conveyors 17 that project transversely to the main unloading conveyors 18 and 19.

For purpose of this description, reference made to unloading vessels and transporting cargo from the vessels to conveyors for unloading shall apply to loading cargo from the shore, land or loading vessels or vehicles to the floating dock and conveyor 10 to the vessels 11, 12, 13 and 14, among others.

The individual conveyors 18 and 19 are suitably supported and motor driven with the conveyor 18 moving to the right and conveyor 19 moving to the left. Individuals located at each of the separate projecting conveyors 17 will unload segregated cargo on each of the conveyors 18 and 19 for positioning into one of the awaiting vehicles or trailers 16.

A longitudinally-extending main conveyor system 20 extends from the shoreline outwardly into the water for a suitable distance depending upon the traffic and facilities required for the particular topography and location. A series of floating barges 21 through 28 is arranged in alignment with each individual floating barge suitably anchored by means of piles 29 to which are connected suitable flexible connecting members 30 to fasten to the floating barge to maintain the barge in its aligned floating position relative to the other barges in the series. Sufficient slack is maintained in the connecting members 30 to compensate for tide fluctuations and waves incident to vessel movement.

The piling 29 may take the form of individual piles or a pylon 31 suitably secured by concrete columns 32 embedded along the shoreline bottom 33.

The individual barges 21 through 28 that are suitably moored to the anchoring piles or pylons 29 may be fabricated of wood, metal, concrete, plastic or combination thereof, and have a sufficient buoyant force to support substantial loads that are placed on the conveyors that are positioned stationarily and span each of the floating barges 21 through 28. A series of pivotally-connected conveyor strips 35 reach between the terminal portions of the barge-mounted conveyors 34 to convey cargo continuously from the endless belt conveyors that are motor-driven to convey cargo continuously along a directed path of travel from one conveyor section to another from loading to unloading.

There is further illustrated in FIG. 2, the concept of stacking of a second deck of interconnected conveyors suitably spaced vertically above the first deck of conveyors 34 and 35 and in which the barge supported second tier conveyor 36 is suitably supported through the housing 37 for maintaining the motors, bearings and supports for each tier. The interconnecting conveyor 38 for the second deck of conveyors forms the conveyor link that reaches between the floating barges to transmit the cargo from the floating barge supported conveyor units 36 in the directed path of travel. A third level or deck 39 utilizing a similar conveyor 40 is positioned above the floating barge 26 as well as a fourth deck 41 with its stationarily-mounted endless supporting conveyor 42. The conveyor supporting columns 43 and 44 will be elevated to accommodate the additional mechanisms for supporting and driving the additional conveyors in the system along the longitudinally-extending conveyor supporting system 20.

A pair of laterally-extending floating barges 46 and 47 to the left of the longitudinally-extending system 20, and floating barges 48 and 49 extending to the right are similarly anchored in position as the floating barges 21 through 28 to support and receive cooperatively the projecting transversely-extending conveyor systems 50 and 51 which are basically similar to the arrangement described heretofore and applicable to the first deck or level as shown in FIG. 2. However, each of the conveyor systems 50 and 51 preferably includes separately operable adjacent sections 52 and 53 for the system 50, and 54 and 55 for the conveyor system 51. The bifurcation of each of the conveyor systems 50 and 51 enables cargo to be unloaded or loaded on either side from a vessel without commingling the cargo. It will be readily understood, however, that a single conveyor may be utilized depending upon the nature of the specific installation and the types of cargo to be unloaded. The terminal ends 56 of the laterally-extending conveyor systems or fingers 50 and 51 may be at the same level or at different levels as shown in FIG. 2 for unloading onto the longitudinally-extending conveyor system 20.

The longitudinally extending conveyor system 20 may also be bifurcated into two separate sections 57 and 58 at the same or different levels, depending upon the particular installation. When the conveyors are at the same level, a partition may be installed between conveyors, if desirable, to separate the cargo. In other installations, different levels for the conveyors may be desirable but each type is contemplated.

Motor drives as well as the specific chain and other linkages have been omitted since they are basically conventional in the conveyor technology.

Additional laterally-extending conveyor systems or fingers 60, 61, 62, 63, and 65 may be provided depending upon the specific installation requirements and each will be basically similar to conveyor systems 50 and 51, except for the fact that the individual conveyors may be elevated to different levels to avoid commingling of the cargo being transported along the main line 20.

There may also be provided a separate laterally-extending conveyor system 64 in which the floating barges 66 and 67 support a pair of crane mounting rails 68 that are spaced laterally from each other with a connecting section 69 reaching between adjacent barges for supporting the gantry or crane 70 thereon for displacement along the rails 68 and 69. The crane or gantry 70 is provided with a conventional superstructure 71 for raising or lowering a containerized unit provided the vessel does not have its own loading and unloading crane for handling containerized cargo. The containerized unit may be deposited on the endless conveyor member 72 for movement to the main line conveyor 20 which may be implemented with an auxiliary conveyor to support the containerized trailer units.

Suitable dolphin or other appropriate vessel mooring members 73 may be provided for retaining a vessel in its loading or unloading position with other appropriate vessel securing lines being connected to the pylons 29.

Cargo being unloaded from the main line 20 is segregated at the terminal end 75 of the main line conveyors for distribution to the conveyors 18 and 19 for ultimate unloading to the individual conveyor positions 17. In the system illustrated in FIG. 1, appropriate securing means may be utilized to retain the main line 20 in position along the shore. However, the present system has application to offshore installation also, depending upon the specific topography. Unloading at the terminal end 75 of the line 20 may be achieved by unloading into suitable vessels for shallow water mobility.

In FIG. 3, the laterally-projecting conveyor system 50 is illustrated with the vessel 11 moored in position. However, the bifurcated conveyor arrangement is illustrated in a modified form in which the bifurcated sections 52 and 53, as shown in FIG. 1, are illustrated at two different levels in FIG. 3 as 52' and 53'. The conveyors 52' and 53' discharge the cargo at the terminal ends 56' onto the different levels of the main line 20 conveyors 57' for each level adjacent to the companion conveyor sections 58' divided by the partition or wall 76 therebetween. The right side conveyor system 51 also has its individual conveyors 54' and 55' at spaced levels similar to conveyors 52' and 53' to feed onto the vertically-spaced longitudinally-extending conveyors 58'.

For some installations, appropriate shelter in the form of a roof 77 suitably supported by vertical studs 78 may be provided. Also a walkway 79 for personnel as well as a guardrail (not shown) to prevent cargo from falling off the conveyors may be installed.

Figure 5:
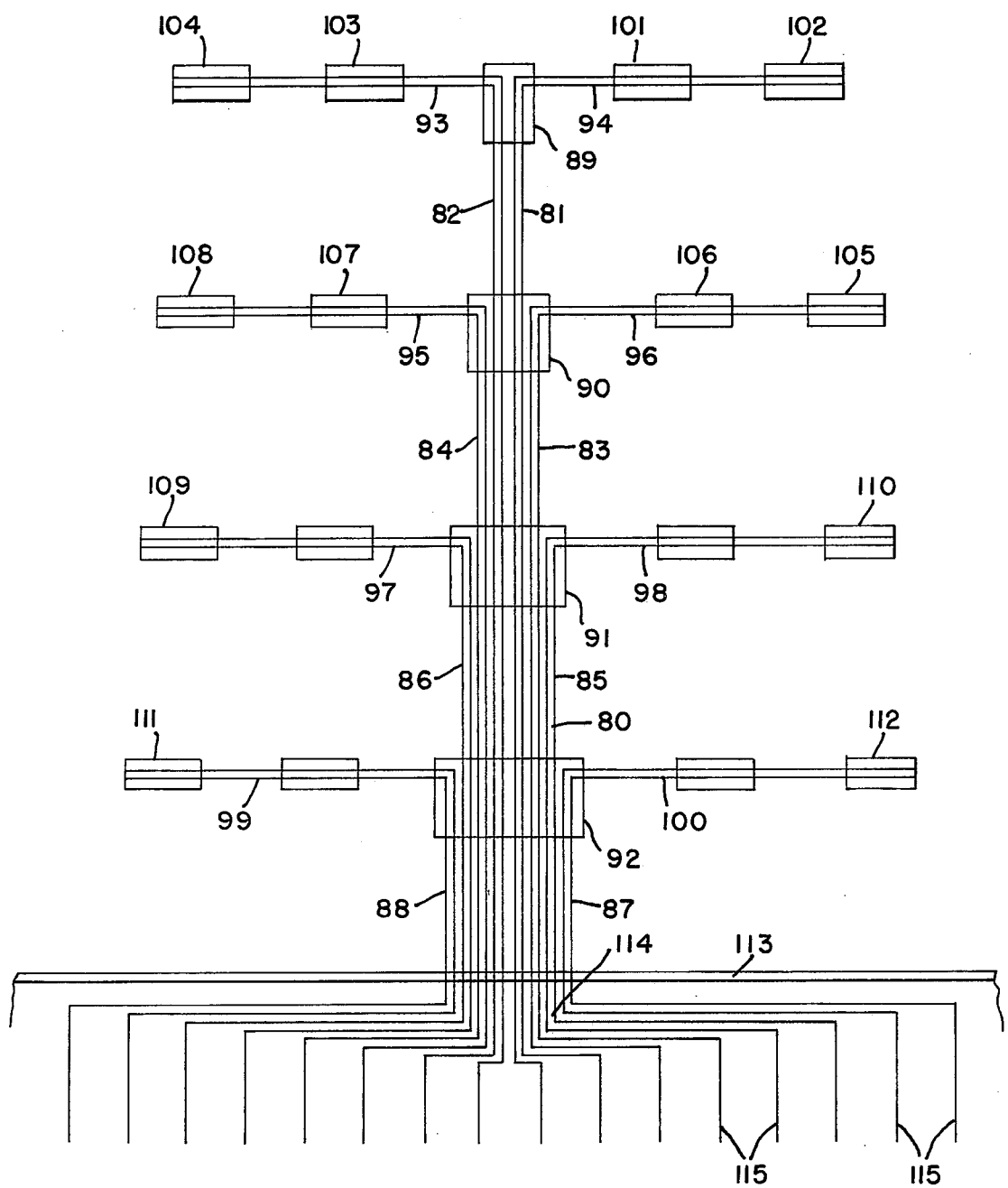
FIG. 5 is a top plan view of a schematic illustration of an alternate conveyor system for the floating dock conveyor system in which the conveyors are laterally disposed substantially in the same plane for conveying cargo from or to the individual transversely extending fingers or conveyor means.

A modified conveyor system using the same basic arrangement as illustrated in FIG. 1 is shown in FIG. 5 in which the longitudinally-extending main conveyor section 80 is provided with a series of individual conveyor members 81-88 which is suitably supported on the floating barge members 89-92 with each of the conveyors 81-88 being substantially of the same endless belt type previously described in conjunction with the embodiment illustrated in FIGS. 1 through 3.

The laterally-projecting conveyor systems or fingers 93-100 extend for a suitable distance laterally from the main line 80 with each finger conveyor system also being supported on floating barge members 101-112. In the embodiment illustrated in FIG. 5, the various conveyors may be supported at the same level with each branch being continuous from loading to unloading.

The dock or curbing 113 is the terminus to which the individual conveyors branch off at the junction 114 to extend laterally for the individual conveyors to discharge the cargo at the terminal ramp 115 for transportation to other locations. In the reverse, cargo may be loaded on the ramps 115 and conveyed to the conveying system for loading aboard a vessel docked adjacent to one or more of the laterally-extending conveyor means.

It will be readily apparent that the conveyor means for one of the laterally-extending members may be enlarged as well as one of the conveyors for the main line 80 to receive and transport a containerized unit. Also, a crane or gantry may be supported on the finger-conveying member desired for offloading or onloading containerized freight in the event the vessel is not provided with its own crane.

It is further contemplated that various types of conveyors and associated control machineries such as counters, label scanners and weighing devices, may be employed whether of the chain-link or continuous belt type, depending upon the climatic conditions and the nature of the cargo to be handled. Assembly and disassembly of the entire system may be readily achieved for movement from one location to another, depending upon the topography and conditions of the harbor.

I claim:

1. A floating dock for transporting cargo from and to a vessel comprising; a series of longitudinally-extending cargo-conveying supporting means, means retaining said cargo conveying supporting means in a floated and aligned condition, cargo conveying means affixed to said longitudinally-extending cargo-conveying supporting means to transport cargo along said cargo-conveying supporting means in a directed path of travel, pivotally-connected conveying means joining said affixed conveying means, means for mooring a vessel adjacent to said longitudinally extending cargo-conveying supporting means for unloading or loading cargo from said cargo-conveying means, at least one transversely-extending cargo-conveying supporting means cooperatively operable with said longitudinally-extending cargo-conveying supporting means, means for retaining said transversely-extending cargo-conveying supporting means in a floated and aligned condition, cargo-conveying means affixed to said transversely-extending cargo-conveying supporting means to transport cargo along said transversely extending cargo conveying supporting means to said cargo-conveying means on said longitudinally-extending cargo-conveying supporting means.

2. A floating dock as claimed in claim 1, wherein said conveyor means comprises multiple-tiered interconnected endless conveyors.

3. A floating dock as claimed in claim 1, one of said transversely-extending cargo-supporting means having crane supporting means extending thereon, and a crane for raising and lowering containerized units to and from a vessel to and from said longitudinally-extending cargo conveying means.

4. A floating dock as claimed in claim 1, said cargo conveyor means on said transversely-extending cargo-supporting means being bifurcated into two sections traveling adjacent each other substantially in the same plane.

5. A floating dock as claimed in claim 1, said cargo conveyor means on said transversely-extending cargo-supporting means being multi-tiered with each tier being spaced laterally and vertically from each other.